United States Patent [19]
Kato et al.

[11] Patent Number: 5,771,357
[45] Date of Patent: Jun. 23, 1998

[54] ENCODING/DECODING FIELDS OF PREDETERMINED FIELD POLARITY APPARATUS AND METHOD

[75] Inventors: Motoki Kato; Hideki Koyanagi, both of Kanagawa; Toru Wada, Saitama, all of Japan

[73] Assignee: Sony Corporation, Tokyo, Japan

[21] Appl. No.: 701,754

[22] Filed: Aug. 22, 1996

[30] Foreign Application Priority Data

Aug. 23, 1995 [JP] Japan ................................... 7-214675

[51] Int. Cl.⁶ .................................................. G06F 13/00
[52] U.S. Cl. ........................................................ 395/200.77
[58] Field of Search ..................... 395/200.77; 348/384, 348/390, 404, 409, 396, 447, 429, 430, 431; 364/715.02

[56] References Cited

U.S. PATENT DOCUMENTS 5,463,565  10/1995  Cookson et al. ...................... 348/396
5,465,119  11/1995  Demos .................................. 348/447

*Primary Examiner*—Ellis B. Ramirez
*Attorney, Agent, or Firm*—Frommer Lawrence & Haug LLP; William S. Frommer

[57] ABSTRACT

A moving picture is encoded into groups of video image pictures with each frame composed of fields of different field polarities including a predetermined field polarity. The polarity of the first field of a series of frames to be encoded into a respective group of image pictures is set to the predetermined field polarity. Alternatively, the polarity of the first field of the series of frames may be identified by data transmitted with the encoded moving picture. The encoded moving picture is decoded at a decode start time designated when the first field in each respective group of image pictures is of the predetermined field polarity. Alternatively, the decode start time is generated on the basis of the data designating the field polarity of the first field. A computer-readable medium provides a medium on which the encoded moving picture is recorded and directs a computer to decode the encoded moving picture when the first image picture in each respective group of image pictures is an encoded field of the predetermined field polarity or, alternatively, when the field read from the medium is the first field as designated by designating data.

58 Claims, 14 Drawing Sheets

FIG.2A

| | Tf | Bf | Tf | Bf | Tf | Bf | Tf | Bf | Tf | Bf | Tf | Bf | Tf | Bf | Tf | Bf |
|---|---|---|---|---|---|---|---|---|---|---|---|---|---|---|---|---|

FIG.2B ENCODER INPUT

| F0 | F1 | F2 | F3 | F4 | F5 | F6 | F7 |
|---|---|---|---|---|---|---|---|

FIG.2C FRAME

| f0 | f1 | x1 | f2 | f3 | x3 | f4 | f5 | x5 | f6 | f7 | x7 |
|---|---|---|---|---|---|---|---|---|---|---|---|

FIG.2D TFF

| 1 | 1 | | 1 | 1 | | 1 | 1 | | 1 | 1 | |
|---|---|---|---|---|---|---|---|---|---|---|---|

FIG.2E RFF

| 0 | 0 | | 0 | 1 | | 0 | 0 | | 1 | 1 | |
|---|---|---|---|---|---|---|---|---|---|---|---|

FIG.2F GOP

| 0 | 1 | | 1 | 1 | | 0 | 1 | | 0 | 1 | |
|---|---|---|---|---|---|---|---|---|---|---|---|

FIG.2G

| B | P | B | I | B | P | B | I |
|---|---|---|---|---|---|---|---|

|----GOP1----|----GOP2----|----GOP3----|

| | | | | | | | | | |
|---|---|---|---|---|---|---|---|---|---|
| FIG.4A DECODER INPUT | i2 | I2\|B0 | \|B1 | b0 \|b1 | -- P5 | \|p5 b3 | \|B3 | \|B4 | b4 |
| FIG.4B TFF | 0 | 1 | 1 | 1 | 1 | 1 | 0 | 1 | -- |
| FIG.4C RFF | 0 | 0 | 1 | 1 | 1 | 1 | 1 | 0 | 1 |
| FIG.4D DECODER OUTPUT | | \|B0 | \|B1 | b0 \|b1 | \|i2 | \|B3 b3 | \|B3 | \|B4 | \|P5 p5 |
| FIG.4E | Tf | Bf Tf | Bf Tf | Bf Tf | Bf Tf | Bf Tf | Bf Tf | Bf Tf | Bf Tf Bf |

← DECODING START TIME

← SCHEDULED DISPLAY STARTING TIME

| Syntax | No. of bits |
| --- | --- |
| group_of_pictures(){ | |
|    group_start_code | 32 |
|    time_code | 25 |
|    closed_gop | 1 |
|    broken_link | 1 |
| | |
|    if(nextbits()==extension_start_code){ | |
|      extension_start_code | 32 |
|      while(nextbits()!='0000 0000 00000000 0000 00001'){ | |
|         group_extension_data | 8 |
|      } | |
|      next+_start_code() | |
|    } | |
| | |
|    if(nextbits()==user_data_start_code){ | |
|      user_data_start_code | 32 |
| | |
|      first_field_parity_GOP | 1 |
|      last_field_parity_GOP | 1 |
|      reserved | 6 |
| | |
|      while(nextbits()!='0000 0000 00000000 0000 00001'){ | |
|         user_data | 8 |
|      } | |
|      next_start_code() | |
|    } | |
| | |
|    do { | |
|      picture() | |
|    } while(nextbits()==picture_start_code) | |
| } | |

FIG.5

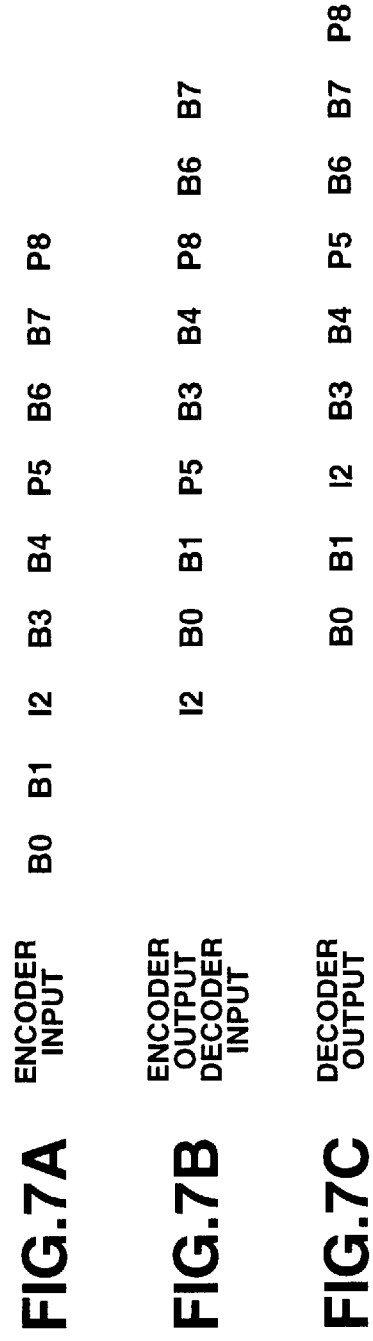

FIG.8A
FILM
(24 FRAMES/
SECOND)
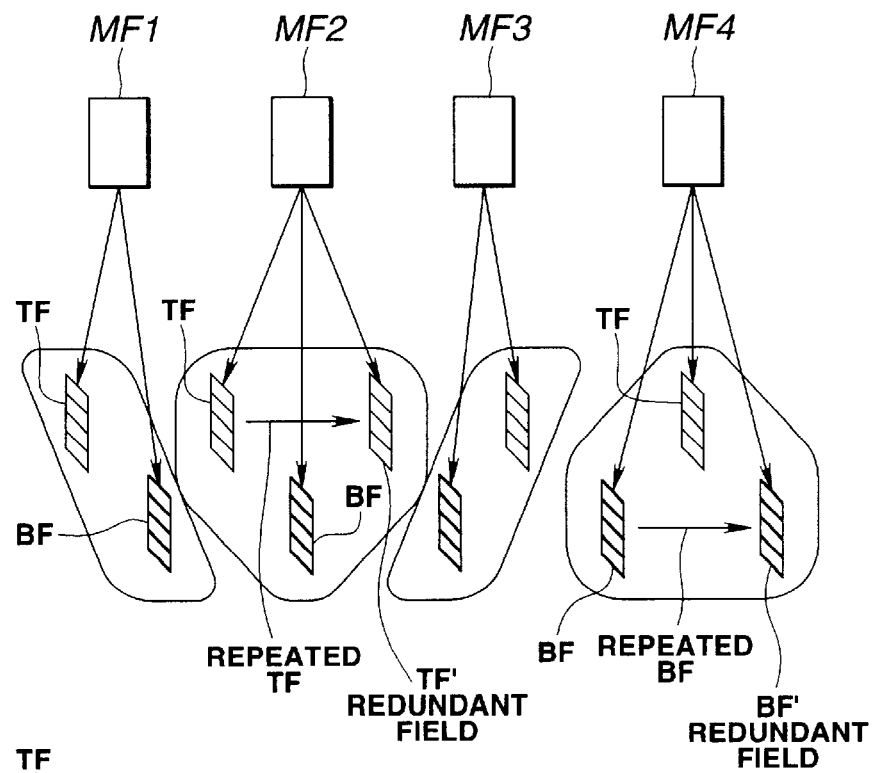
FIG.8B
INPUT FILM SOURCE/
INTERLACED VIDEO
(30FRAMES/SECOND,
60 FIELD/SECOND)
FIG.8C
INPUT FRAME
TO ENCODER
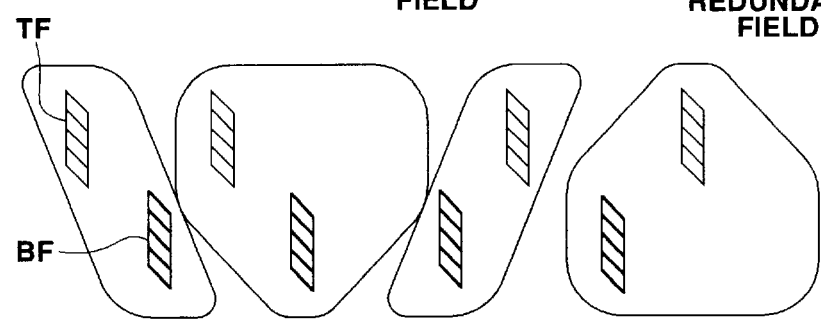
FIG.8D
TOP FIELD FIRST FLAG    1    1    0    0
FIG.8E
REPEAT FIRST FIELD FLAG    0    1    0    1
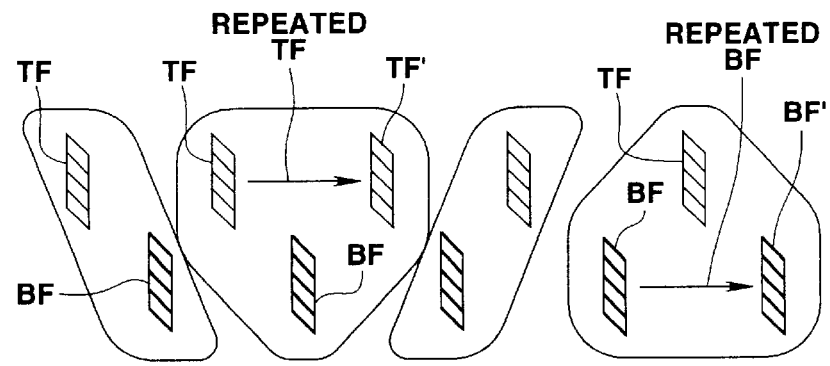
FIG.8F
OUTPUT FRAME
FROM DECODER

| | | | | | | | | | | | | | | | | | | | | | | | |
|---|---|---|---|---|---|---|---|---|---|---|---|---|---|---|---|---|---|---|---|---|---|---|---|
| FIG.9A FIELD SYNCHRONIZING SIGNAL | Tf | Bf | Tf | Bf | Tf | Bf | Tf | Bf | Tf | Bf | Tf | Bf | Tf | Bf | Tf | Bf | Tf | Bf | Tf | Bf | Tf | Bf | Tf Bf |
| FIG.9B INPUT TO ENCODER | | B0 | | B1 → x1 | | I2 | | B3 → x3 | | B4 | | P5 → x5 | | | | | | | | | | | |
| | b0 | | b1 | | i2 | | b3 | | b4 | | p5 | | | | | | | | | | | | |
| FIG.9C FRAME START TIMING | 1 | | 1 | | 1 | | 1 | | 1 | | 1 | | | | | | | | | | | | |
| FIG.9D TFF | 0 | | 1 | | 1 | | 1 | | 0 | | 0 | | | | | | | | | | | | |
| FIG.9E RFF | 0 | | 1 | | 0 | | 1 | | 0 | | 1 | | | | | | | | | | | | |
| FIG.9F OUTPUT FROM ENCODER | | | | | I2 | | B0 | | B1 | | P5 | | --- | | B3 | | B4 | | | | | | |
| | | | | | i2 b0 | | b1 | | --- | | p5 | | --- | | b3 | | b4 | | | | | | |
| FIG.9G | | | | | 1 | 1 | 1 | | 1 | | 1 | | 1 | | 1 | | | | | | | | |
| FIG.9H TFF | | | | | 1 | 0 | 0 | | 0 | | 0 | | 1 | | 1 | | 0 | | | | | | |
| FIG.9I RFF | | | | | 0 | 0 | 1 | | 0 | | 1 | | 1 | | 1 | | 0 | | | | | | |

FIG.10A DECODER INPUT: I2 | B0 | B1 | | P5 | B3 | | B4

FIG.10B TFF: i2 | b0 | == | b1 | -- | p5 | b3 | b4

FIG.10C RFF: 1 | 0 | 0 | 0 | 0 | 1 | 1 | 0
0 | 0 | == | 1 | 1 | 0 | 1 | 0

FIG.10D DECODER OUTPUT: xx | B0 | B1 | I2 | B3 | B4 | P5
xx | b0 | b1 | i2 | b3 | b4 | p5

FIG.10E Tf Bf Tf Bf Tf Bf Tf Bf Tf Bf Tf Bf Tf Bf Tf Bf
↑
DECODING START TIME

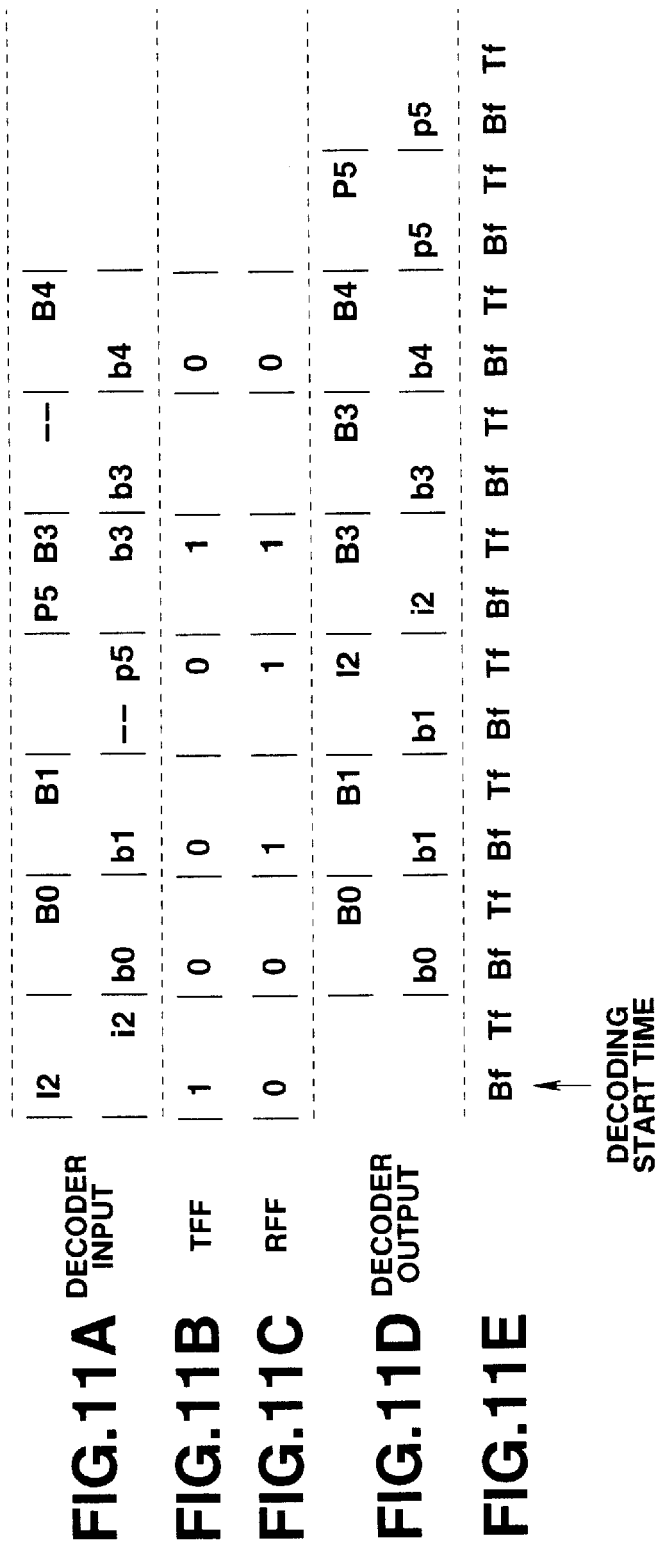

ENCODING/DECODING FIELDS OF PREDETERMINED FIELD POLARITY APPARATUS AND METHOD

BACKGROUND OF THE INVENTION

The present invention relates to encoding and decoding moving pictures, and, more particularly, to encoding and decoding fields of a 3:2 pulldown converted moving picture on the basis of a predetermined field polarity.

Highly efficient encoding of a video signal is important in digital video signal recording. This is especially true for encoding lengthy moving pictures as video signals on small-sized recording media having small capacities for recording information. The MPEG (Moving Picture Expert Group) standard is a highly efficient encoding standard that compresses the video signal by finding correlations of data between video frames in the video signal. The MPEG standard finds correlations between data between video frames in the temporal dimension by taking a difference between frames of data of the video signal, thereby compressing the video signal in the time dimension. The MPEG standard also finds correlations between data in the spatial dimension by processing the video signal within each video frame through an orthogonal transform, such as a Discrete Cosine Transform (DCT) and the like, thereby compressing the video signal in the spatial dimension. The video frames compressed under the MPEG standard include three kinds of picture frames: an I-picture frame which is compressed without reference to other picture frames; a P-picture frame which is compressed using a preceding picture frame; and a B-picture frame which is compressed using both forward and preceding picture frames.

A collection of video frames is known as a group of pictures (GOP) in a moving image sequence, each group of pictures beginning with a GOP start code which identifies the beginning of each GOP. A decoder accesses the group of pictures by detecting the GOP start code and begins decoding at a desired point in the group of pictures. An example of a group of pictures is shown FIGS. 6A, 6B which include an image signal of nine frames (F0 to F8). Notably, the I-picture frame is encoded with its own image information and is, therefore, called an intra-frame. The P-picture frames are encoded using either a past I-picture frame or a past P-picture frame, which is referred to as forward predictive encoding. The B-picture frames are encoded using both past and future picture frames and this encoding is referred to as bi-directional predictive encoding. Since the P-picture and B-picture frames employ other frames for encoding, these picture frames are referred to as inter-frames. It is important to note that the first two frames (F0, F1) in FIGS. 6A and 6B are B-picture frames which do not have preceding picture frames. In this instance, B-picture frames (F0, F1) are encoded using only future reference frames, and this is referred to as backward predictive encoding.

FIGS. 7A–7C depict timing charts for encoding and decoding the group of pictures shown in FIG. 6A. The group of pictures is input to an encoder in the order shown in FIG. 7A. It will be noted that the B-picture frame (BO) is input to the encoder first, which is problematic because B-frames cannot be encoded without an I-picture frame as a reference image, but the I-picture must have been prepared in advance and here no such picture frame exists prior to (BO). To resolve this problem, the encoder rearranges the order of the picture frames as shown in FIG. 7B such that the I-picture frame (I2) is encoded first even though it temporally follows the B-pictures, and the B-picture frames (B0, B1) are encoded on the basis of the I-picture frame (I2). The remainder of the picture frames are, then, encoded. The P-picture frame (P5) is encoded by forward prediction, using the I-picture frame (I2). Next, B-picture frames (B3, B4) are encoded by bi-directional prediction encoding using the temporal past reference image (I2) and the temporal future reference image (P5). Encoding is continued in this manner for the remainder of the picture frames in the group of pictures and the resulting encoded frames are output from the encoder and subsequently input to the decoder as shown FIG. 7B.

At this point, the encoded group of pictures may be transmitted to a decoder by broadcast transmission, by recording and playback from record media or by other known transmission methods. The decoder decodes the group of pictures shown in FIG. 7B and outputs them in the order shown in FIG. 7C, thus restoring the picture order to the original order shown in FIG. 7A so that the video signal may be properly displayed.

MPEG-2 is a modified MPEG standard particularly suited for encoding frames of interlaced fields. As shown in FIGS. 8A, 8B, frames (MF1–4) each includes top fields interlaced with bottom fields. These fields are treated by the MPEG-2 standard as separate frames to be encoded in sequential order. For example, the top field of the first frame (MF1) is first encoded followed by: the bottom field of the first frame, the top field of the second frame (MF2), the bottom field of the second frame and, then, the redundant top field of the second frame, etc. To distinguish between top and bottom fields, the MPEG-2 standard prescribes a top field first flag which identifies the sequential order of the fields in each frame. Thus, for example, the top field first flag in FIG. 8D is a "1" when the top field is first, and is a "0" when the bottom field is first.

The top field first flag is particularly important when a group of pictures is converted from a film source, such as a movie, to an interlaced video signal by use of, for example, a movie/television pulldown converter. According to the 3:2 pulldown technique, each frame is standardized into a two-field frame. For example, the frames shown in FIG. 8B which represent an input film source (such as a 30 frames/second; 60 fields/second moving picture) including two-field frames and three-field frames, are converted into an interlaced video signal of entirely two-field frames. This may be done by removing a redundant field in each of the three-field frames (MF2, MF4), resulting in the two-field frames shown in FIG. 8C. The 3:2 pulldown conversion thus converts three-field frames to two-field frames, hence the name 3:2 pulldown conversion.

The 3:2 pulldown converter must identify which fields are redundant in order to remove these redundant fields. To identify the redundant fields in the three-field frames for 3:2 pulldown conversions, the MPEG-2 standard provides a repeat first field flag for indicating which fields are redundant. The 3:2 pulldown converter determines from the repeat first field flag which fields are redundant fields and should be removed from the 3:2 frames. For example, the repeat first field flag in FIG. 8E for the first frame (MF1) is set to "0" indicating that no redundant field exists in the first frame. On the other hand, the repeat first field flag for the second frame (MF2) is set to "1" indicating that a redundant field exists in that frame.

It shall be noted from FIG. 8B (compare frames MF2 and MF4) that either the top field or the bottom field may be redundant, and it is not clear to the 3:2 pulldown converter solely from sensing the repeat first flag which of the top or bottom fields is repeated. To determine whether the top field or the bottom field is the redundant field, the 3:2 hold down conversion analyzes the top field first flag. When the top field first flag is a "1", for example, (FIG. 8E) corresponding to the frame (MF2) in FIG. 8C, the first field in the second frame is a top field and is deemed redundant. When the top field first flag is a "0", on the other hand, and the repeat first flag is a "1" and the bottom field is deemed to be the redundant field, as is the case in the fourth frame (MF4) of FIG. 8C.

When the encoded interlaced video signal of FIG. 8C is to be decoded, the redundant fields removed upon encoding must be restored. This is shown in FIG. 8F, wherein the redundant fields which were removed upon encoding are restored by repeating the first field in the frame. To identify which fields were removed, the decoder senses the top field first flag and the repeat first field flag. For example, the top field first flag in the second frame (MF2) is a "1" indicating that the top field is first and controlling the decoder to repeat the top field for the second frame. On the other hand, the top field first flag for the fourth frame (MF4) is a "0" and, therefore, the decoder repeats the bottom field. In this manner, the decoder restores the fields from the two-field interlaced video signal to a threefield moving picture appropriate for display.

The top and bottom fields of the interlaced video signal present a decoding problem which will be made clear by first understanding the encoding process. FIGS. 9A–I depict timing charts of the interlaced video signal as it is encoded. A field synchronizing signal in FIG. 9A comprising a top field signal alternating with a bottom field signal synchronizes the encoding of the respective top and bottom fields shown in FIG. 9B. The series of fields in FIG. 9B input to the encoder are designated by a letter prefix indicating the type of video frame (I, B, P) and a numerical suffix indicating the order in which that video field is to be displayed.

To explain the field order reference is now made to FIG. 9B, wherein the first field input to the encoder is the bottom field of a B-picture frame (b0), and the next field input to the encoder is the top field of the same B-picture frame (B0). The bottom field (b1) of the next B-picture is input next to the encoder followed by the top field (B1). The next field input to the encoder labelled x1 represents a redundant field of the preceding bottom field (b1). Next, the top field of an I-picture frame (I2) is input to the encoder, followed by the bottom field of the I-picture (i2). The top field of the B-picture (B3) is, then, input into the encoder, followed by its bottom field (b3). The picture frames are input to the encoder in this manner until the last bottom field (x5), which is the redundant field of the P-picture bottom field (p5), is input to the encoder.

To continue the encoding process explanation, a frame start timing flag (FIG. 9C) is set to "1" when a corresponding frame is to be encoded. The encoder removes the redundant fields before encoding using the top field first and repeat first field flags (FIGS. 9D and 9E) as explained above. As a result of the 3:2 pulldown conversion during encoding, blanks "--" are formed (FIG. 9F) in the encoded output where the repeated fields (x1, x3 and x5) once existed. The fields are then encoded as shown in FIG. 9F, where it will be noted that the encoding process rearranges the fields so that the I-picture frame is encoded before the B-picture frames allowing the following B-picture frames (B1, B1) to be bi-directionally encoded using, at least, the I-picture frame. For the same reason, the P-picture frame (P5) is encoded before the B-picture frames (B3, B4) so that the B-picture frames can be bi-directionally encoded using, at least, the P-picture frame (P5). The encoder generates a frame start timing flag (FIG. 9G) to indicate the beginning of each group of pictures. The top field first and repeat first field flags (FIGS. 9H and 9I, respectively) are rearranged to be transmitted with their corresponding fields.

The encoded output of FIG. 9F is transmitted by, for example, television transmission or the like, to a receiver where it is input to a decoder as the series of fields shown in FIG. 10A. The input to the decoder in Fig. 10A should be the same as the output of the encoder shown in FIG. 9F if the original moving picture is to be displayed with accuracy. The top field first flag and the repeat first field flag, also transmitted with the encoded output (Figs. 10B and 10C, respectively) are used by the decoder to determine which fields were removed by the abovediscussed 3:2 pulldown conversion. The decoder, then, decodes the encoded fields to derive the original moving picture, repeating the redundant fields which were removed upon encoding. Assuming that decoding is performed without error, the decoder output should mirror the input to the encoder (FIG. 9B) so that the original moving picture video signal is precisely restored.

The timing of decoding is determined by a field synchronizing clock signal shown in FIG. 10E which is comprised of a top field synchronizing signal alternating with a bottom field synchronizing signal. To simplify this discussion, it is assumed that the decoder decodes the encoded frames without delay, such that no field synchronizing cycles elapse during decoding.

Problematically, the first field in the decoder output is a bottom field (b0) as shown in Fig. 10D and, as will be noted, the field synchronizing signal is set to the top field synchronizing cycle at this time. This means that the bottom field (b0) must be delayed, as shown by "xx" in the first field position of Fig. 10D, until the bottom field synchronizing cycle. That is, the bottom field (b0) must be delayed for one cycle before being displayed in order that the bottom field may be decoded.

It would have been better to decode the bottom field first since the bottom field would be synchronized with the bottom field synchronizing cycle. However, it is not possible to know in advance of decoding the group of pictures that the top field is input first to the decoder during the bottom field synchronizing cycle. This is because MPEG dictates that the group of pictures be decoded and displayed in real time, and it is not possible to receive the group of pictures in advance to determine which field type is first.

Compare the above problematic situation to FIGS. 11A–11E which illustrate the desired situation where the bottom field is synchronized with the bottom field synchronizing cycle in the first field in each frame. In this situation, the bottom field (b0) need not be delayed by a field synchronizing cycle because it is already synchronized and can be displayed immediately after decoding.

In addition to the problem of delaying the display time by one cycle, the decoder must stop inputting the transmitted encoded video signal during this cycle. This is shown in FIG. 10A, where the decoder is halted during the time indicated by the symbol "==". In the case where a buffer is employed to receive the transmitted encoder output, stopping the decoder may result in an overflow of the buffer.

Furthermore, when two groups of pictures (GOP1, GOP2) are combined or edited as shown in FIG. 12, a gap indicated by (xx) appears when the last field in the first group of pictures (GOP1) is of the same type of field (top or bottom fields) as the first field in the second group of pictures (GOP2). To explain, as shown in FIG. 12, the last field of GOP1 is a top field and is synchronized with a top field synchronizing cycle (Tf). The second group of pictures (GOP2) begins also with a top field and the decoder must wait until the next top field synchronizing cycle by skipping over a bottom field synchronizing cycle, thus resulting in the gap (xx). Since there is no way of knowing in advance the field polarity of the first field in the second group of pictures (GOP2), it is necessary to decode the entire second group of pictures and check the field polarity found at the end of the second group of pictures. Problematically, where the data length of the second group of pictures is long, the decoding takes a very long time and the efficiency of the decoder deteriorates.

OBJECTS AND SUMMARY OF THE INVENTION

The present invention has, as its objective, to prevent a delay caused by a mismatch in field polarity between the first field of a respective group of pictures and the field synchronizing signal.

The present invention further has, as its objective, to prevent the decoder buffer from overflowing as a result of the delay caused by the mismatch.

The present invention further has, as its objective, to combine and edit a plurality of groups of pictures without the need for decoding the entire group of pictures to determine the field polarities.

In accordance with the above objectives, a first embodiment of the present invention provides a moving picture encoding apparatus and method for encoding frames of a moving picture into groups of image pictures with each frame composed of a plurality of fields of different field polarities including a predetermined field polarity. The polarity of the first field of a series of frames to be encoded into respective groups of image pictures is set to the predetermined field polarity.

As a feature of the first embodiment, a decoder controller generates a decode start time signal at a time when the first image picture in each respective group of image pictures is of the predetermined field polarity to begin decoding and the groups of image pictures.

A computer-readable medium is also provided to direct a computer to begin decoding a recorded signal of the encoded moving picture when the first image picture in each respective group of image pictures is an encoded field of the predetermined field polarity.

According to another embodiment of the present invention, a moving picture encoding apparatus and method are provided for encoding frames of a moving picture into groups of image pictures with each frame composed of a plurality of fields of different field polarities including a predetermined field polarity. The polarity of the first field of a series of frames to be encoded into respective groups of image pictures is set to the predetermined field polarity and data designating the first field is generated. The series of frames is encoded and transmitted along with the data designating the first field.

A decoding apparatus and method controls a decode start time to begin decoding when the first field designated by the data generated upon encoding is detected.

A computer-readable medium directs a computer to start decoding when a field read from the medium is the first field designated by the designating data.

With the above embodiments, the first field of each group of pictures is known in advance of decoding and may be matched to the field synchronizing signal. As a result, the onecycle delay in reading the groups of image pictures caused by a mismatch is prevented. This further has the result of preventing a decoder buffer from overflowing since there is no occasion for the decoding system to halt reading from the decoder. In addition, the present invention prevents a gap from forming between a plurality of groups of image pictures because the polarity of the first field in each group of pictures is controlled such that no gap in image pictures may occur between the groups. Thus, a plurality of groups of image pictures may be combined and edited without a gap formed therebetween.

BRIEF DESCRIPTION OF THE DRAWINGS

FIGS. 2A–2G are timing charts that depict the timing of signals in the encoding system of FIG. 1;

FIGS. 4A–4E are timing charts that depict the timing of signals in the decoding system of FIG. 3;

FIG. 5 shows syntax of a bit stream according to the present invention;

FIGS. 7A–7C are timing charts showing the order of frames to be processed in the group of pictures of FIG. 6A or 6B;

FIGS. 8A–8F are schematic diagrams of frames comprising fields for explaining a 3:2 pulldown process;

FIGS. 9A–9I are timing charts for explaining the encoding process of a group of pictures to which a 3:2 pulldown process has been applied;

FIGS. 10A–10E are timing charts for explaining the decoding process of the group of pictures encoded according to FIGS. 9A–9I in the problematic situation where the field synchronizing signal is not synchronized with the first field of the group of pictures;

FIGS. 11A–11E are timing charts for explaining the decoding of the group of pictures when the field synchronizing signal is synchronized with the first field of the group of pictures;

DETAILED DESCRIPTION OF THE PREFERRED EMBODIMENTS

Figure 1:
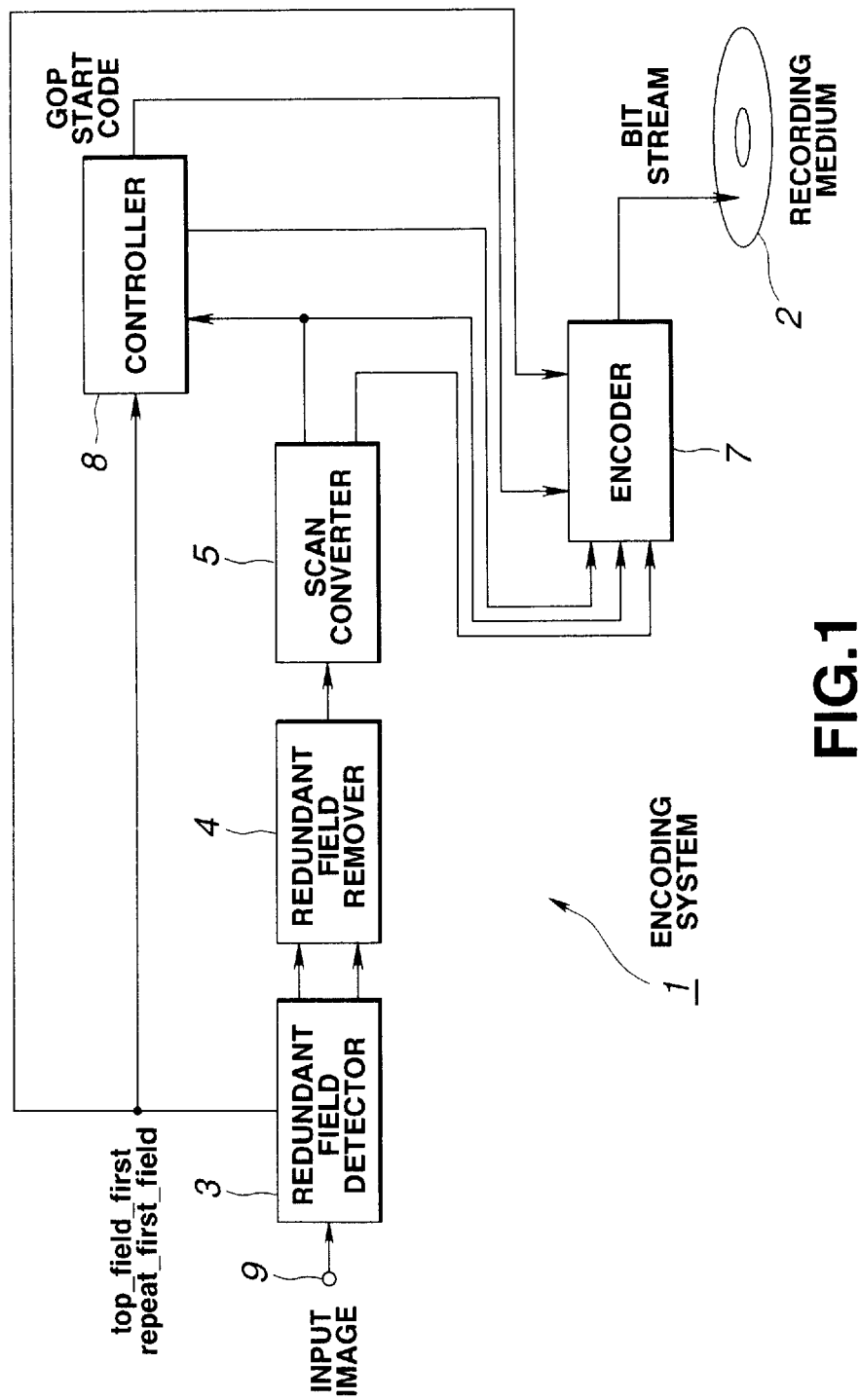
FIG. 1 is a block diagram of an encoding system according to the present invention.

Referring now to the drawings wherein like reference numerals designate identical or corresponding parts throughout the several views, an image encoding system is shown in FIG. 1. The encoding system 1 compression-encodes television signals converted from a movie picture by a movie/television converter (tele-cine converter) according to the MPEG-2 standard, resulting in the input film source of FIG. 8B.

A redundant field detector 3 detects redundant fields and outputs the top field first flag and the repeat first field flag to a redundant field remover 4 which removes the redundant fields. A scan converter 5 receives the remaining fields and converts them into encoding blocks for encoding into (I, B, P) picture frames which are recorded on recording medium 2, such as an optical disk, a video tape or similar recording media. Meanwhile, a controller 8 outputs a GOP start code to an encoder 7 to begin the encoding on the basis of the top field first and repeat first field flags. It will be noted that the flags are also sent to the encoder directly for encoding on the recording medium 2. The encoder 7 encodes the encoding blocks on the basis of: correlations between the series of frames according to the MPEG-2 standard, the top field first and repeat first field flags, the type of image data and flags showing the start time of the frames.

The encoding process will be described in more detail beginning with a discussion of the 3:2 pulldown conversion process. The 3:2 pulldown conversion is performed on the video signal before being input to the encoding system of FIG. 1 resulting in the interlaced video signal of FIG. 8B. When such a 3:2 pulldown process is performed, redundant top fields are formed, for example, in frames MF2 and MF6 and redundant bottom fields are formed in, for example, frames MF4 and MF8.

The redundant field detector 3 detects the redundant fields by determining whether the field image is an image generated by repeating two consecutive fields having the same field polarity, a field polarity being the type of field (top or bottom fields). This may be accomplished by judging whether the sum of absolute value differences of pixels between two fields, for example, is smaller than a predetermined threshold value which may be set, for example, according to a degree of equality between two fields. The redundant field detector generates a detection output (i.e., the repeat first field flag) of, for example, "1" when the field is redundant and a detection output of "0" when the field is not redundant. In this example, the detection output and the field are forwarded to the redundant field remover 4 which removes the redundant field when the detection output is set to "1". The redundant field remover 4, thus, removes the redundant fields resulting in the two-field interlaced video signal shown in FIG. 8C. It will be appreciated that this process has the advantage of reducing the amount of data to be transmitted by omitting the repeated fields from the encoding process. The repeat first field flag is also forwarded to the controller 8 and the encoder 7 for encoding on the recording medium 2.

Upon decoding, the top field first flag is needed to determine which field (top or bottom field) is to be repeated in the next frame when the repeat first field flag indicates a redundant field. This is because the repeat first field flag indicates only that the first field in the frame is to be repeated and the first field may be either the top or bottom field. Thus, it is not possible to determine if the top or bottom field is to be repeated simply by detecting the repeat first field flag. To resolve this problem, the redundant field detector generates the top field first flag to indicate which of the top or bottom fields is first in the frame and, therefore, to be repeated upon decoding when the repeat first field flag is "on".

The scan converter 5 converts the fields remaining after the redundant field remover 4 into a series of frames (f0, F0, f1, F1, etc.) as shown, for example, in FIG. 2B and outputs this scan-converted series of frames to the encoder 7. This is done so that each field is treated as a separate frame encoded sequentially by the encoder. The scan converter generates flags indicating the timing for each of the scan converted frames and sends flags to the controller 8 so that the encoding for these frames can be precisely timed.

In the first embodiment according to the present invention, the controller generates a GOP start code on the basis of the top field first and the repeat first field flags such that the field to be displayed at the beginning of the group of pictures is a top field and the last field of this group of pictures is a bottom field. Each of the fields, scan converted as frames by the scan converter is encoded by the encoder using image encoding-type specifying data for specifying a compression encoding method for the I, B or P picture frames generated by the controller on the basis of the generated GOP start code. For example, the specifying data may describe which scan-converted frames are I, B or P picture frames and which frames are used to predictively encode the B and P frames.

FIGS. 2A–2G are timing charts for explaining the encoding process of the encoding system shown in FIG. 1. The field synchronizing signal (FIG. 2A) supplied from an external apparatus such as a monitor, for example, times the encoding of the video frame. The video frames (FIG. 2B) including the redundant fields (x1, x3 and x5) are input to the input terminal 9. The frame start signal (FIG. 2C) generated by the scan converter 5 indicates when each frame begins and the top field first and repeat first field flags (FIGS. 2D and 2E) which have been explained with reference to FIGS. 4B and 4C indicate the order of the fields in each frame.

The controller generates the GOP start code as explained to start a respective group of pictures when a top field is present and end the group of pictures when a bottom field is present. The controller determines the remainder of the picture frames to be included in each group of pictures between the first and last picture frames by adaptively selecting the order of frames. MPEG provides that the P-picture frames will occur at least every third frame with two frames in between, and I-picture frames every sixth frame at an interval. However, in the present invention, the number of frames is adaptively adjusted to satisfy the condition that the first field of the group of pictures is a top field and the last field is a bottom field. This is done by adaptively selecting the interval between I-frames, which is not problematic because the I-picture frames are intra-frames, i.e., are not predictively encoded. Otherwise, if the interval between the B and P-picture frames is adaptively selected, the inter-frame compression structure of the B and P frames would be disturbed.

While, in the present invention, the GOP start code begins with a top field synchronizing cycle, the GOP start code may also begin with a bottom field. When the field synchronizing signal begins with a bottom field (Bf) synchronizing cycle, it is preferred that the first field be a bottom field and the last field be a top field in order that the fields are synchronized with the field synchronizing signal.

In the preferred embodiment, the controller terminates a current group of pictures, for example GOP1, with a field which is of the bottom field polarity. Advantageously, the bottom field (xl) as shown in FIG. 2B is redundant and can be easily discarded if it appears at the end of a group of pictures. Thus, the redundant bottom fields are chosen by the present invention as the last field in each GOP. It will be noted, that the GOP start code (FIG. 2F) for the next group of pictures begins at the timing of the top fields (F2) and (F6). In the example of FIG. 2G, the image encoding type specifying data (i.e., I, B and P picture frame data) formed by controller 8 shows the start frame of a group of pictures is a B-picture frame and an end frame of the group of pictures is a P-picture frame. The specifying data for an I-picture frame when a P-picture is compression encoded is also shown.

Upon receiving the GOP start code, the encoder compression encodes each of the received frames into an I-picture, a P-picture, or a B-picture frame using the specifying data shown in FIG. 2G. That is, the first pair of fields of GOP2 (F2, f2) are encoded as a B-picture frame and the second pair of fields (F3, f3) as an I-picture frame. These frames are encoded and transmitted as a stream of bits according to the MPEG standard. The encoder appends a header to the beginning of the bit stream for each group of pictures comprising the encoded frames. The header may include, for example, information about the length of the bit stream of bits for the corresponding group of pictures as well as other information for retrieving and decoding the encoded frames. The encoder further appends the top field first and repeat first field flags to each frame. In the present invention, the encoded bit stream is transmitted as a recording on the optical disc 2 according to a syntax defined by the MPEG-2 (ISO/IEC 13818-2) standard.

The controller 8 generates the GOP start code at a time when the first field of the group of pictures exhibits a field polarity (i.e., the type of field) which corresponds to the field synchronizing signal on the decoding side. For example, in FIGS. 2A–2G, the controller causes the first field in each group of pictures (GOP1, GOP2 and GOP3) to exhibit the top field polarity in order to be synchronized with the top field synchronizing cycle (FIG. 2A) upon decoding. The controller also controls the field polarity of the last field by turning off the GOP start code and, in the example of FIGS. 2A–2G, the controller causes the last field to exhibit the bottom field polarity. As a result, the optical disc 2 stores the groups of pictures on the recording medium in bit streams of groups of pictures, with the first field having the top field polarity and the last field having the bottom field polarity.

The present invention is not limited to storing the encoded information on a recording medium. The video signal, for example, may be transmitted to a receiving source via other media such as over the air transmission, cable transmission, internet communication, video tape and the like.

Figure 3:
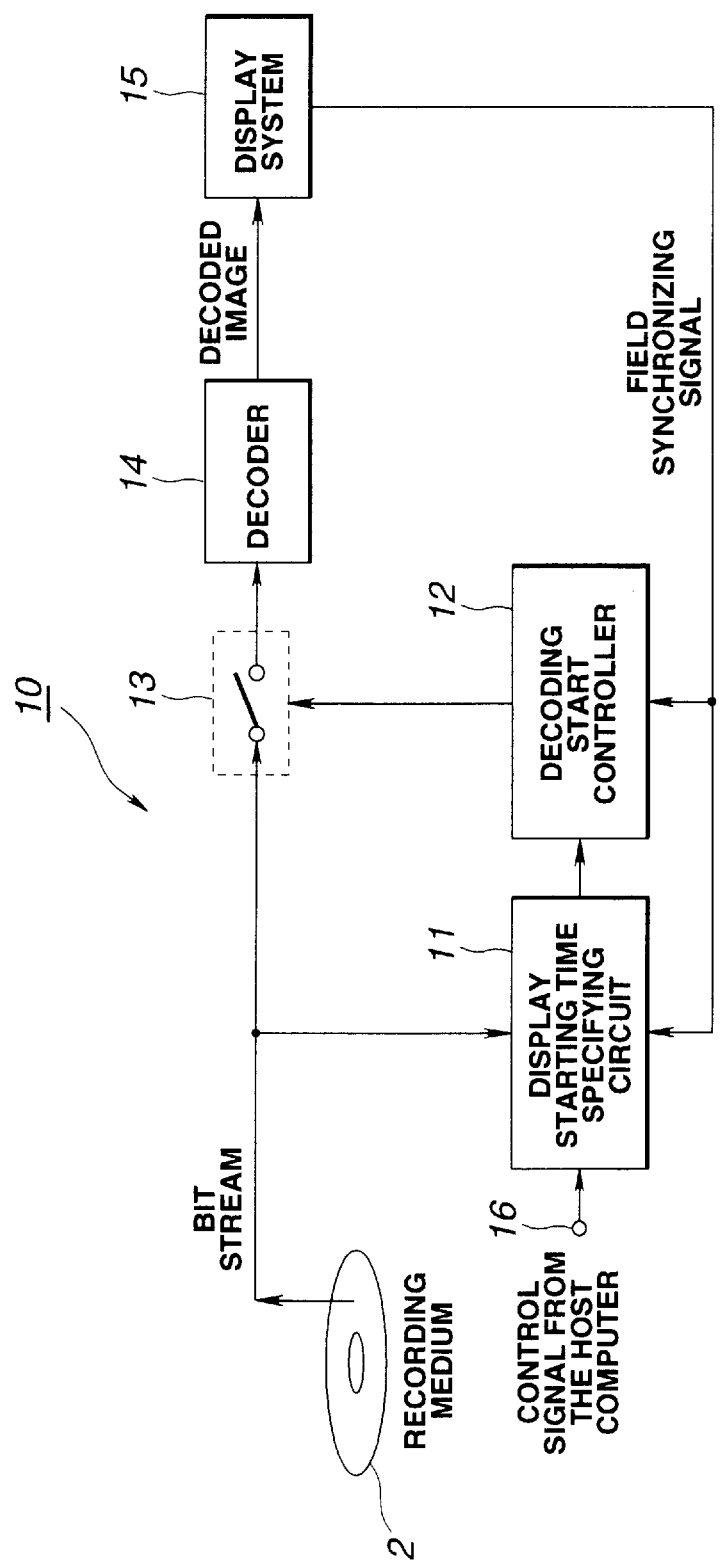
FIG. 3 is a block diagram of a decoding system according to the present invention.
Figure 6A:
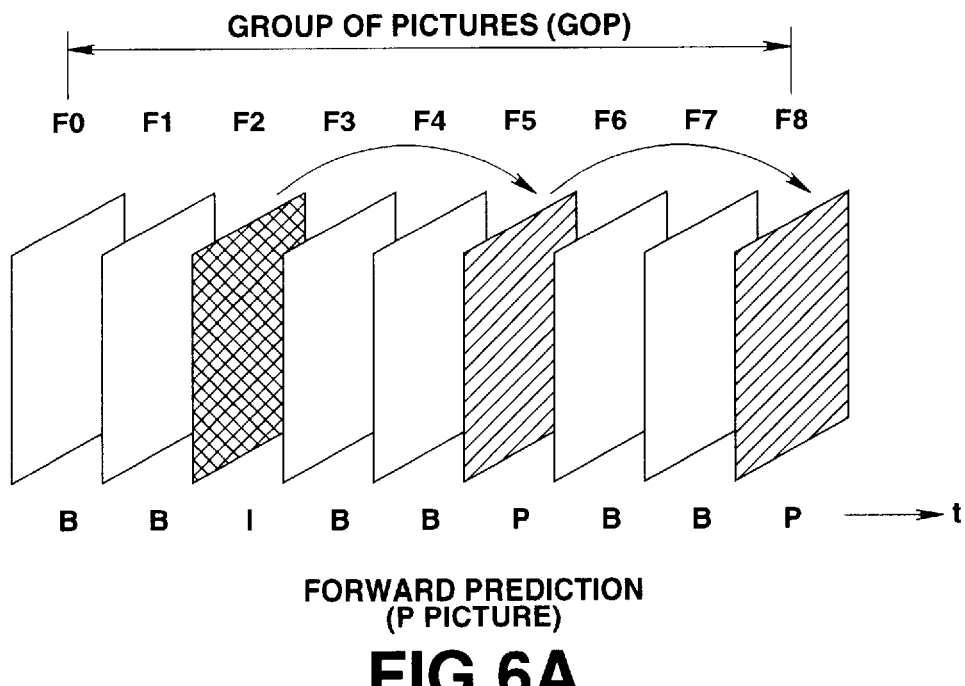
FIGS. 6A, 6B show groups of pictures (GOP) for explaining predictive encoding.
Figure 6B:
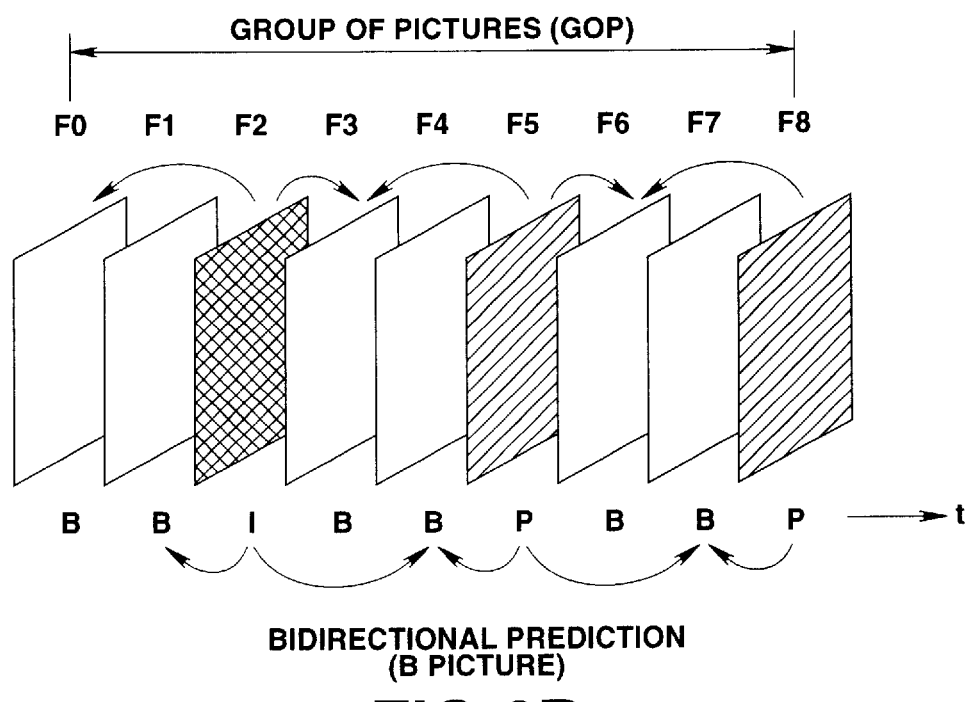
Figure 12:
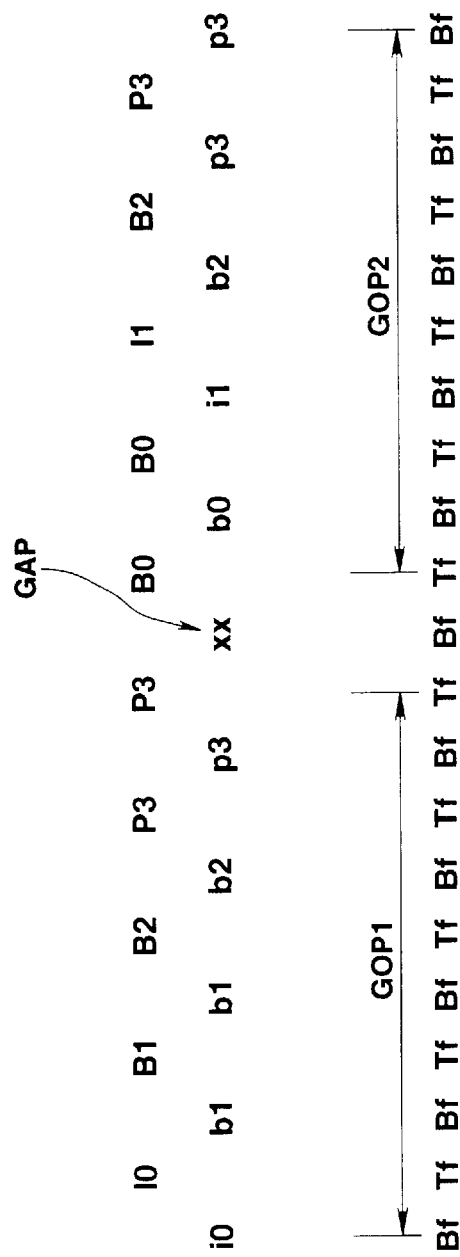
FIG. 12 is a schematic diagram explaining the problem of combining a plurality of group of pictures.

After transmission, the image data recorded on the optical disc 2 is reproduced by the decoding system 10 shown in FIG. 3. Briefly, the reproduced bit streams are fed to a decoder 14 which decodes the bit streams according to the MPEG standard and the decoded signals are displayed by a display system 15. The display system generates the field synchronizing signal for the decoding system and sends this signal to both a display starting time specifying circuit 11 and a decoding start controller 12 which, together with a control signal from the host computer (such as a microprocessor, not shown) input to terminal 16, control a switch 13 to begin decoding.

The decoding now will be discussed in more detail. The encoded image is reproduced from the recording medium 2 as a bit stream of encoded groups of pictures and sent to the switch 13. The display starting time specifying circuit 11 receives specifying data from the host computer via input terminal 16 for specifying the point at which decoding is to begin in a group of pictures. For example, the specifying data may specify that the image be decoded at the beginning or middle of a given group of pictures relative to the field synchronizing signal (FIG. 4E).

As shown in FIG. 4E, for example, arrows pointing to specific cycles of the field synchronizing signal generated by the display system 15 indicate a schedule for the display starting time. The second arrow along the axis indicates the time when the group of pictures is scheduled to be decoded and displayed. However, the time when decoding actually begins is set two cycles ahead at the first arrow to account for the two cycles required to process the group of pictures prior to decoding.

The display starting time is determined by data using three parameters: the field synchronizing signal which forms the field designated by the arrows; the specifying data which indicates the point where decoding begins in each group of pictures; and the bit stream of the group of pictures reproduced from the optical disc 2. The display starting time specifying data is sent to the decoding start controller 12 which computes the decoding start time from this representative data. At the time decoding is to begin, the decoding start controller turns the switch 13 "on", thereby allowing the bit stream of the group of pictures to be forwarded to the decoder 14. Similarly, the decoding start controller turns the switch "off" at the end of decoding, thereby cutting off the bit stream of the group of pictures to the decoder.

In the present invention, the encoded group of pictures is encoded with the first field being of the predetermined polarity and the last field being of a field polarity opposite to the predetermined field polarity. In the preferred embodiment, the first field of the group of pictures is encoded as a top field and the last field of the group of pictures is encoded as a bottom field.

With the present invention, the polarity of the first field is known prior to decoding the group of pictures. During decoding, therefore, the decoding start time is scheduled to begin with a top field as shown by the second arrow in FIG. 4E. For simplicity, the decoder is assumed to decode an encoded frame with no delay in decoding. However, as referred to above, two field cycles are used by the display starting time specifying circuit 11 to generate the display starting time specifying data and the decoding start controller to compute the time at which to switch "on" the switch 13. Therefore, the decoding start controller 12 switches "on" the switch two field cycles before the scheduled display starting time as shown by the first arrow (FIG. 4E) in order that the decoder will decode the groups of pictures two cycles later at the precise time the first frame is to be displayed.

The decoding of a group of pictures will be explained with reference to the timing charts of FIGS. 4A–4E. Encoded frames, each having top and bottom fields, are encoded and transmitted to the decoder input in the sequential order shown in FIG. 4A. The I, B and P-picture frames are represented by the corresponding letter in either upper case or lower case representing the top field or bottom field polarities followed by a number indicating the order in which the frames are to be displayed. The top field flag (FIG. 4B) indicates which field (top or bottom) is first in the series for a particular frame while the repeat first field flag indicates whether the first field in each frame is to be repeated for the next frame. In the present invention, a decode stop signal "--" generated by the encoder is inserted into the place where the first field is to be repeated, causing the decoder to pause for one field and repeatedly display the field indicated by the repeat first field flag. FIG. 4D shows the output from the decoder 14, wherein it will be appreciated that the original order of the group of pictures before encoding is restored.

It will be appreciated that the present invention makes it unnecessary to match a display cycle of the field synchronizing signal to the field polarity of the decoder input. This prevents the one-field delay caused by a mismatch of the field synchronizing cycle with the field polarity of the first field, thereby preventing the buffer of the decoder 14 from overflowing during the delay time.

With the present invention, each group of pictures is composed so that the first field is of a predetermined field polarity, preferably the top field, while the last field is preferably the bottom field. With this arrangement, no gap between groups of pictures is formed and it is possible to combine and edit a plurality of groups of pictures.

In addition to these advantages, it is no longer necessary to decode the entire group of pictures to ascertain the last field polarity because the last field polarity is known prior to decoding. With the present invention it is, thus, possible to efficiently combine and edit the group of pictures even when the groups of pictures are long in data length.

The decoding system of the present invention is compatible with encoding systems other than the type described with reference to FIG. 1. With other encoding systems, it will be recalled that it may not be possible to know prior to decoding the field polarity of the first field to be displayed in a group of pictures. Hence, the first field to be decoded and displayed may not be synchronized with the field synchronizing signal generated by the display system 15 and the decoder 14 must wait one cycle in order to match the first field polarity with the field synchronizing signal. That is, the decoding is halted for one cycle and the decoder 14 stops reading image data from its buffer (not shown) for one cycle. As a result, image data tends to accumulate in the decoder buffer such that there is the possibility of an overflow if the bit rate of the image data into the decoder buffer is high.

To resolve this problem, the present invention provides an additional buffer of memory in the decoder to store a field in advance of the present field. The buffer size (B) for the additional buffer (not shown) may be calculated by knowing the receiving buffer size (VBV buffer size) and the bit rate (R) specified in the header of a group of pictures. The capacity (B) of the additional buffer memory may be given by the following expression:

$$B = VBV \text{ buffer size} + R \times (\text{time of one field}).$$

With the additional buffer of capacity (B), the buffer of the present invention can be prevented from overflowing in the case where the first field to be displayed is not synchronized with the field synchronizing signal.

Figure 13:
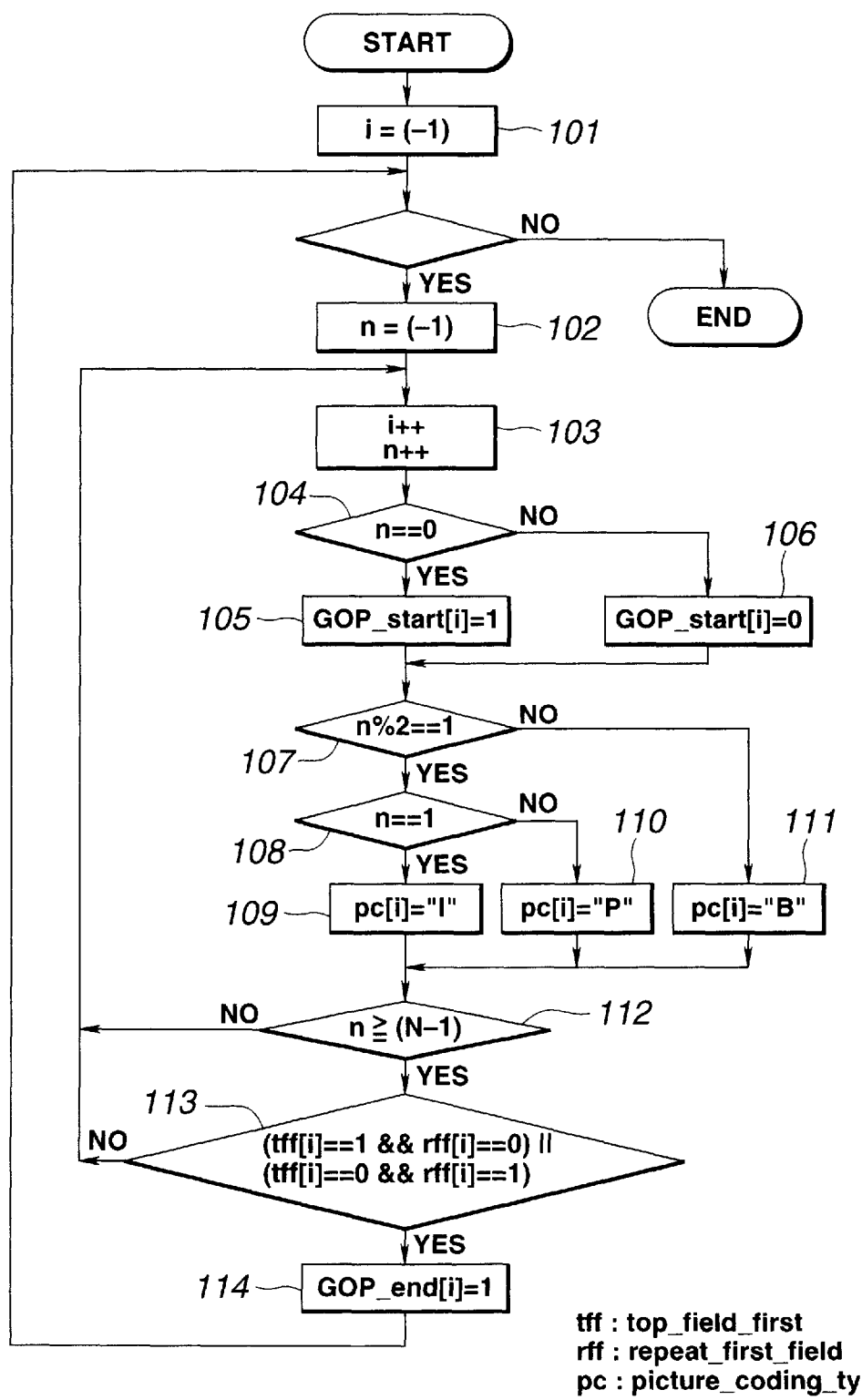
FIG. 13 is a flow chart used by a first embodiment of the present invention.

The operation of the controller 8 (FIG. 1) is explained in more detail with reference to the flow chart of FIG. 13 which shows the routine of the controller to determine the time to generate the GOP start code. The controller starts the process by initializing a variable (i) to the value "−1" in step 101. Here, i represents an order of frames sent to the encoder 7 as provided by the scan converter 5. The controller, then, inquires whether there are more frames to be decoded and, if so, advances to step 102. If no more frames are to be decoded, the controller proceeds to the end of the routine.

The controller, in step 102, initializes a variable (n) to "−1". Here, n represents an order of frames within a particular group of pictures. In step 103, the controller increments both variables (i) and (n), such that the variables (i) and (n) are initially set to "0" before beginning a nested loop. The controller inquires, at 104, whether variable (n) is at "0", meaning that the present frame is the first frame of a group of pictures and, if so, proceeds to step 105 which sets the GOP start code to "1". Otherwise, if the present frame is not the first frame of the group of pictures, the controller proceeds to step 106 which sets the GOP start decode signal to "0".

The controller, in steps 107 to 111, determines the picture coding type of each frame designated as either the I, B or P picture coding types (steps 109, 111 and 110). In inquiry 107, for example, the controller judges whether or not the variable (n) is odd and, if so, proceeds to inquiry 108. If not, the routine proceeds step 111 and designates the present frame as a B-picture frame. In inquiry 108, the controller determines whether the variable (n) which has been determined to be even, is "1" and, if so, designates the present frame as an I-picture frame in step 109, otherwise designating the present picture frame as a P-picture frame in step 110.

The controller, in steps 112–114 determines when the group of pictures is to end. The controller adaptively determines the end of the group of pictures so that the last field to be displayed is preferably a bottom field. Consequently, the groups of pictures may be of varying frame length (N). In inquiry 112, the controller determines whether the present frame is on the next to last frame or the frame thereafter in the GOP by determining whether the present frame number (n) is greater or equal to the number of the last frame (N) minus one. If the controller determines that the next to the last frame in the respective group of image pictures has not been reached yet, the controller returns to step 103 and increments the variables. Otherwise, the controller determines that the next to the last frame has been reached and proceeds to inquiry 113.

The controller, in inquiry 113, judges whether the field to be displayed at the end of the present frame is a bottom field by examining the top field first (Tff) flag and the repeat first field (Rff) flag. When, for example, the top field first flag is set to "1" and the repeat first field flag is set to "0" a top field is first in the present frame and is not to be repeated for the next frame. When the top field first flag is set to "0" and the repeat first field flag is set to "1", for example, the bottom field is first, but is repeated for the next frame. In this situation, the controller determines that the group of pictures should end and generates the GOP end decode signal in step 114, causing the last field in the group of pictures to be a bottom field.

It will be appreciated that the next field, which is the first field in the next group of pictures, is a top field since the last field in the preceding group of pictures is a bottom field. When the next group of pictures is processed, the controller proceeds to step 103 and increments the variable (i). The routine continues as described above for each group of pictures until the end of the moving picture.

Another embodiment of the present invention has a similar configuration as the encoding system 1 shown in FIG. 1, but differs in the controlling routine executed by the controller 8. In this embodiment, the controller generates a first field polarity flag which indicates the field polarity of the first field in the first frame of the respective group of pictures and a last field polarity flag indicating the last field polarity. These flags are recorded on the recording medium. With this embodiment, there is no limitation of where the group of pictures must start and end because the first and last fields are not limited to top and bottom fields, respectively.

Preferably, the first and last field polarities are transmitted as part of the user data area reserved by the MPEG standard for user-allocated special applications. FIG. 5 shows the syntax for a bit stream of a group of pictures including the user data area according to this embodiment. The group of pictures begins with a group_start_code of 32 bits. The user data area starts with a user_data_start_code of 32 bits followed by the first field polarity (first_field_polarity_GOP) of one bit and the last field polarity (last_field_polarity_GOP) of one bit. In the preferred embodiment a "1" used as either the first field polarity or the last field polarity indicates a top field, whereas a "0" indicates a bottom field. It will be noted that the user data area is arranged in units of one byte and, therefore, it is necessary to reserve an area (reserved) of 6 extra bits to complement the 2 bits of field polarity flags to "fill in" one byte.

The encoder 7 encodes the frames according to a specified image encoding type, such as the I, P or B-picture frames. The encoding system of the presently described embodiment encodes the I-picture frames at intervals of four frames, for example, and an interval for a P-picture set at 2 frames in a group of pictures. It will be appreciated that the number of frames in each group of pictures in this embodiment does not have to be adaptively selected because the field polarity is indicated by the field polarity flags and the first and last fields do not necessarily have to be set to specific field polarities (i.e., top and bottom fields, respectively). The top field first flag and repeat first field flags are added to each frame, as in the previous embodiment. Moreover, a GOP header which includes the user data is appended to each group of pictures when the GOP start code is detected. The syntax shown in FIG. 5 is defined by MPEG-2 (ISO/IEC 13 818-2) standards and is recorded on the optical disk 2. As shown in FIG. 5, the optical disk includes the first field polarity and last field polarity in the user data area in the GOP header.

A decoding system in accordance with this embodiment has a configuration similar to that shown in FIG. 3 for the previously-described embodiment except that the switch 13 is controlled in a different manner by the decoding start controller 12. In this embodiment, display starting time specifying circuit reads the field polarity from the user data recorded in the GOP header and schedules the display starting time of the field cycle corresponding to the field polarity on the field synchronizing signal generated by display system 15. For example, as shown in FIG. 4D, the field polarity of the group of pictures to be displayed first is a top field and the controller selects the top field cycle for the scheduled display starting time as shown in FIG. 4E.

Figure 14:
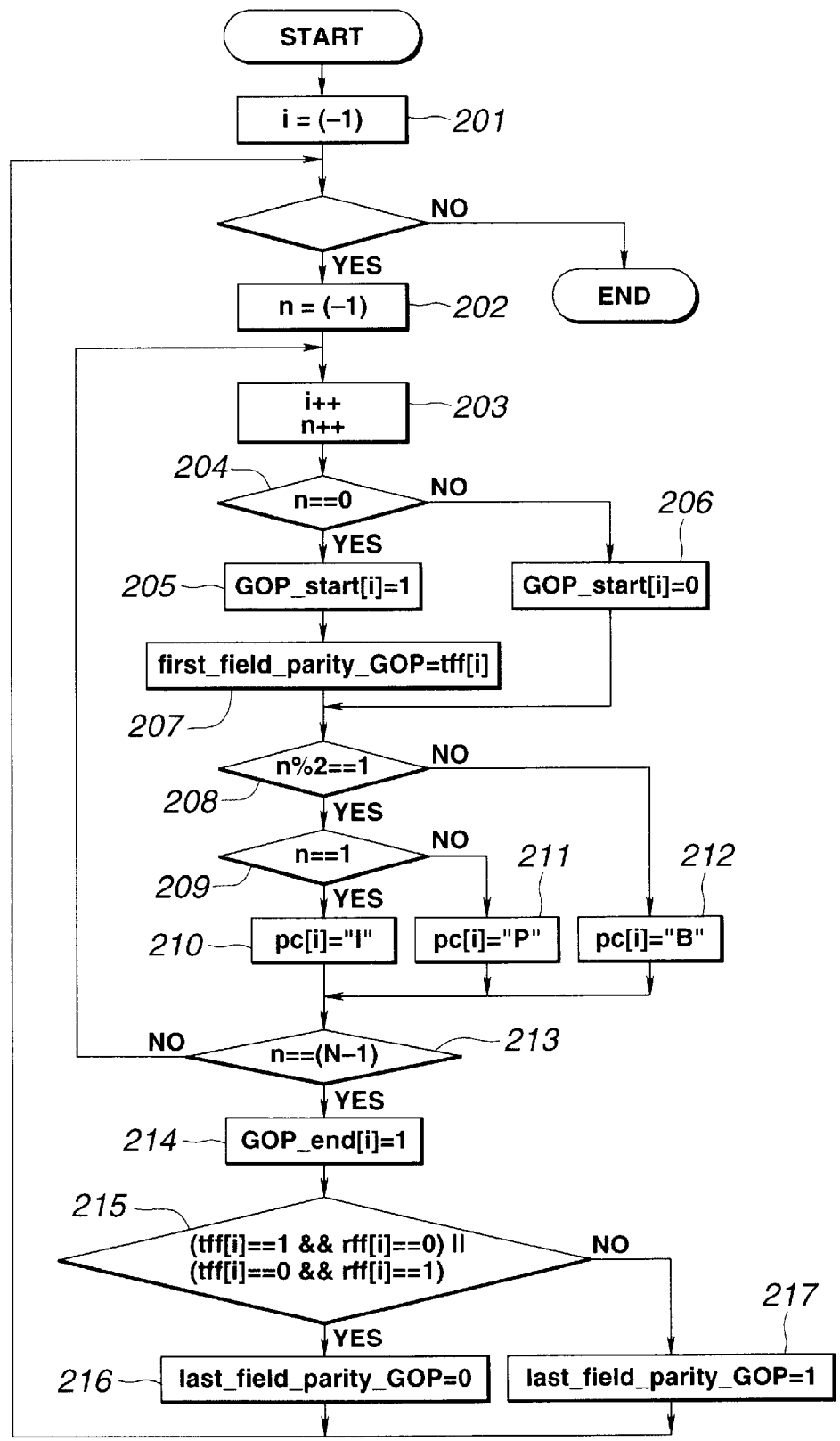
FIG. 14 is a flow chart used by another embodiment of the present invention.

The routine of the controller 8 (FIG. 1) to generate the first and last field polarity flags is shown in detail by the flow chart of FIG. 14. The steps followed in this routine are similar to those taken in the flow chart of the previous embodiment (FIG. 13). Thus, the controller starts the process by initializing the variable (i) to the value "−1" in step 201. The controller, then, inquires whether there are more frames to be decoded and, if so, advances to step 202. If no more frames are to be decoded, the controller proceeds to the end of the routine.

The controller, in step 202, initializes the variable (n) to "−1". In step 203, the controller increments both variables (i) and (n), such that the variables (i) and (n) are initially set to "0" before beginning a nested loop. The controller inquires, at 204, whether variable (n) is at "0", meaning that the present frame is the first frame of a group of pictures and, if so, proceeds to step 205 which sets the GOP start decode signal to "1". Otherwise, if the present frame is not the first frame of the group of pictures, the controller proceeds to step 206 which sets the GOP start decode signal to "0".

Unlike the previous embodiment, the controller here generates the first field polarity flag to, for example, "1". As explained, this generated first field polarity flag is transmitted with the present frame indicating the first field of the respective group of pictures.

Steps 208 to 216 follow the same operations as corresponding steps 108 to 116 in the previous embodiment. Thus, the controller, in steps 208 to 212, determines the picture coding type of each frame designated as either the I, B or P picture coding types (steps 210, 211 and 212). In inquiry 208, for example, the controller judges whether or not the variable (n) is even and, if so, proceeds to inquiry 209. If not, the routine proceeds step 212 and designates the present frame as a B-picture frame. In inquiry 209, the controller determines whether the variable (n) which has been determined to be even, is "1" and, if so, designates the present frame as an I-picture frame in step 210, otherwise designating the present picture frame as a P-picture frame in step 211.

The controller, in steps 213–215 determines when the group of pictures is to end. As with the last embodiment, the controller here adaptively determines the end of the group of pictures so that the last field to be displayed is preferably a bottom field. Consequently, the groups of pictures may be of varying frame length (N). In inquiry 213, the controller determines whether the present frame is the next to last frame or the frame thereafter in the GOP by determining whether the present frame number (n) is greater or equal to the number of the last frame (N) minus one. If the controller determines that the next to the last frame in the respective group of image pictures has not been reached yet, the controller returns to step 203 and increments the variables. Otherwise, the controller determines that the next to the last frame has been reached and proceeds to inquiry 214 where the controller sets the GOP end decode signal to "1".

The controller then proceeds to inquiry 215 and judges whether the field to be displayed at the end of the present frame is a bottom field by examining the top field first (Tff) flag and the repeat first field (Rff) flag. When, for example, the top field first flag is set to "1" and the repeat first field flag is set to "0" a top field is first in the present frame and is not to be repeated for the next frame. When the top field first flag is set to "0" and the repeat first field flag is set to "1", for example, the bottom field is first, but is repeated for the next frame. In this situation, the controller determines that the group of pictures should end and sets the last field polarity flag to "1". As with the first field polarity flag, the last field polarity flag is transmitted with the present frame indicating the present field is the last field in the group of pictures. Otherwise, the controller sets the last field polarity flag to "0".

As in the previous embodiment, the next field, which is the first field in the next group of pictures, is a top field since the last field in the preceding group of pictures is a bottom field. When the next group of pictures is processed, the controller proceeds to step 203 and increments the variable (i). The routine continues as described above for each group of pictures until the end of the moving picture.

Thus, it is possible with the above embodiments to know in advance of decoding a group of pictures the field polarity of the first field where the group of pictures is to start. As in the previous embodiment, it is assumed for simplicity that the decoder 14 can decode a frame without delay. The decoding start controller 12, however, causes decoding to begin two field cycles before the scheduled starting time as shown in FIG. 4E in order account for processing time before decoding and to precisely time the display of the decoded image.

It is also possible to know both the field polarity at the beginning and the end of the group of pictures, thereby suppressing a gap in data from occurring between subsequent groups of pictures. The embodiments described herein, therefore, allow a plurality of groups of pictures to be combined and edited without the problem of a gap forming in between groups of pictures.

Although illustrative embodiments of the invention have been described in detail herein with reference to the accompanying drawings, it is to be noted that the invention is not limited to these embodiments, and that various changes and modifications may be affected therein by one skilled in the art without departing from the scope and spirit of the invention which is intended to be defined by the appended claims.

We claim:

1. A moving picture encoding apparatus for encoding frames of a moving picture into groups of video image pictures including an intra-frame image picture, said frames being composed of a plurality of fields of different field polarities including a predetermined field polarity, comprising:

forming means for forming series of frames to be encoded into respective groups of image pictures such that a first field to be encoded in each of the respective groups of image pictures is a field of said predetermined field polarity; and encoding means for encoding each series of frames formed by said forming means into said respective group of image pictures.

2. The moving picture encoding apparatus according to claim 1, further comprising control means for adaptively selecting a number of frames in each respective group of image pictures such that the first field in each respective group of image pictures is of said predetermined field polarity.

3. The moving picture encoding apparatus according to claim 2, wherein said control means adaptively selects the number of frames in each respective group of image pictures by generating a start code causing said encoding means to start encoding at said first field of said predetermined field polarity.

4. The moving picture encoding apparatus according to claim 3, further comprising field synchronizing signal means for generating a field synchronizing signal of alternating field polarities that controls the timing for the encoding of said fields for different field polarities; and wherein said control means generates said start code to cause said encoding means to encode said first field when said field synchronizing signal is of said predetermined field polarity.

5. The moving picture encoding apparatus according to claim 1, wherein said forming means forms each series of frames such that a last field in the series to be encoded is of a field polarity other than said predetermined field polarity.

6. The moving picture encoding apparatus according to claim 1, wherein said different field polarities are top and bottom field polarities and said forming means forms each series of frames such that said first field is of the top field polarity.

7. The moving picture encoding apparatus according to claim 1, wherein said different field polarities are top and bottom field polarities and said forming means forms each series of frames such that a last field in each series is of the bottom field polarity.

8. A moving picture encoding method for encoding frames of a moving picture into groups of video image pictures including an intra-frame image picture, said frames being composed of a plurality of fields of different field polarities including a predetermined field polarity, comprising the steps of:

forming series of frames to be encoded into respective groups of image pictures such that a first field to be encoded in each of the respective groups of image pictures is a field of said predetermined field polarity; and encoding each series of frames formed into respective group of image pictures.

9. The moving picture encoding method according to claim 8, further comprising the step of adaptively selecting a number of frames in each respective group of image pictures such that the first field in each respective group of image pictures is of said predetermined field polarity.

10. The moving picture encoding method according to claim 9, wherein adaptively selecting the number of frames in each respective group of image pictures further comprises the step of generating a start code causing said encoding means to start encoding at said first field of said predetermined field polarity.

11. The moving picture encoding method according to claim 10, further comprising the step of generating a field synchronizing signal timing the encoding of said fields for different field polarities; and wherein said step of adaptively selecting generates said start code to cause said encoding to encode said first field when said field synchronizing signal is of said predetermined field polarity.

12. The moving picture encoding method according to claim 8, wherein said step of forming forms each series of frames such that a last field in the series to be encoded is of a field polarity other than said predetermined field polarity.

13. The moving picture encoding method according to claim 8, wherein said different field polarities are top and bottom field polarities and said step of forming forms each series of frames such that said first field is of the top field polarity.

14. The moving picture encoding method according to claim 8, wherein said different field polarities are top and bottom field polarities and said step of forming forms each series of frames such that a last field in each series is of the bottom field polarity.

15. A moving picture decoding apparatus for decoding an encoded moving picture of frames encoded as groups of video image pictures including an intra-frame image picture, said frames being composed of a plurality of fields of different field polarities including a predetermined field polarity, comprising:

control means for controlling a decoding start time to decode respective groups of image pictures when said control means senses a first image picture in each respective group of pictures is an encoded field of said predetermined field polarity; and decoding means, responsive to said control means, for decoding each respective group of pictures.

16. The moving picture decoding apparatus according to claim 15, further comprising field synchronizing signal means for generating a field synchronizing signal of alternating field polarities that controls the timing for the decoding of said fields for different field polarities.

17. The moving picture decoding apparatus according to claim 16, wherein said control means generates a start code to cause said decoding means to decode said first field when said field synchronizing signal is of said predetermined field polarity.

18. The moving picture decoding apparatus according to claim 17, wherein the decoded moving picture is displayed, further comprising scheduling means for scheduling the control means to generate said start code two cycles of the field synchronizing signal before said first field is to be displayed.

19. The moving picture decoding apparatus according to claim 15, wherein said decoding means halts decoding when said control means senses that the last image picture in said respective group of pictures decoded is of a field polarity other than said predetermined field polarity.

20. The moving picture decoding apparatus according to claim 15, wherein said different field polarities are top and bottom field polarities and said first image picture is an encoded field of the top field polarity.

21. The moving picture decoding apparatus according to claim 15, wherein said different field polarities are top and bottom field polarities and a last image picture in each respective group of image pictures is an encoded field of the top field polarity.

22. A moving picture decoding method for decoding an encoded moving picture of frames encoded as groups of video image pictures including an intra-frame image picture, said frames composed of a plurality of fields of different field polarities including a predetermined field polarity, comprising the steps of:
  controlling a decoding start time to decode respective groups of image pictures when said control means senses a first image picture in each respective group of pictures is an encoded field of said predetermined field polarity; and
  decoding, in response to said controlling step, each respective group of pictures.

23. The moving picture decoding method according to claim 22, further comprising the step of generating a field synchronizing signal of alternating field polarities that controls the timing for the decoding of said fields for different field polarities.

24. The moving picture decoding method according to claim 23, wherein said step of controlling generates a start code to cause said decoding to decode said first field when said field synchronizing signal is of said predetermined field polarity.

25. The moving picture decoding method according to claim 24, wherein the decoded moving picture is displayed, further comprising the step of scheduling the step of controlling to generate said start code two cycles of the field synchronizing signal before said first field is to be displayed.

26. The moving picture decoding method according to claim 22, wherein said step of decoding is halted when the last image picture in said respective group of pictures decoded is sensed to be of a field polarity other than said predetermined field polarity.

27. The moving picture decoding method according to claim 22, wherein said different field polarities are top and bottom field polarities and said first image picture is an encoded field of the top field polarity.

28. The moving picture decoding method according to claim 22, wherein said different field polarities are top and bottom field polarities and a last image picture in each respective group of image pictures is an encoded field of the top field polarity.

29. A computer-readable medium for directing a computer to decode a recorded signal of an encoded moving picture composed of frames into groups of video image pictures including an intra-frame image picture, said frames being composed of a plurality of fields of different field polarities including a predetermined field polarity, and including a start decode signal for directing said computer to start decoding when a first image picture in each respective group of pictures is an encoded field of the predetermined field polarity.

30. The computer-readable medium according to claim 29, wherein said different field polarities are top and bottom field polarities, further including an end decode signal for directing said computer to stop decoding when a last image picture in each respective group of image pictures is a field of a field polarity other than an encoded field of the predetermined field polarity.

31. The computer-readable medium according to claim 29, wherein said different field polarities are top and bottom field polarities, wherein the start decode signal further directs said computer to start decoding when the first image picture in each respective group of image pictures is an encoded field of the top field polarity.

32. The computer-readable medium according to claim 29, wherein said different field polarities are top and bottom field parities, wherein said start decode signal further directs said computer to stop decoding when a last image picture in each respective group of image pictures is an encoded field of the bottom field polarity.

33. The computer-readable medium according to claim 29, wherein a field synchronizing signal of alternating field polarities controls the timing for the decoding of said fields for different field polarities.

34. The computer-readable medium according to claim 33, wherein said start decode signal further directs said computer to start decoding said first image when said field synchronizing signal is of said predetermined field polarity.

35. The computer-readable medium according to claim 34, wherein the decoded moving picture is displayed, wherein said start decode signal directs said computer to schedule said start code two cycles of the field synchronizing signal before said first field is to be displayed.

36. A moving picture encoding apparatus for encoding a moving picture into groups of video image pictures including an intra-frame image picture, said frames being composed of a plurality of fields of different field polarities including a predetermined field polarity, comprising:
  forming means for forming series of frames to be encoded into respective group of image pictures and for generating data designating the first field in said respective group of image pictures being of the predetermined field polarity;
  encoding means for encoding each series of frames formed by said forming means into said respective groups of image pictures; and
  transmitting means for transmitting the encoded moving picture encoded by said encoding means and for transmitting said data designating said first field of the predetermined field polarity in each respective group of image pictures.

37. The moving picture encoding apparatus according to claim 36, wherein said respective group of image pictures is transmitted as a stream of bits including a header with reserved areas for header information; and
  said transmitting means further transmits as header information data designating that a last frame in each series to be encoded is a field of polarity other than said predetermined field polarity.

38. The moving picture encoding apparatus according to claim 37, wherein said transmitting means further arranges said header information according to an MPEG standard and transmits said data designating said first and last frames as user data.

39. The moving picture encoding apparatus according to claim 36, wherein said different field polarities are top and bottom field polarities and said forming means forms each series of frames such that said first field is of the top field polarity.

40. The moving picture encoding apparatus according to claim 36, wherein said different field polarities are top and bottom field polarities and said forming means forms each series of frames such that a last field in each series is of the bottom field polarity.

41. A moving picture encoding method for encoding a moving picture into groups of video image pictures including an intra-frame image picture, said frames being composed of a plurality of fields of different field polarities including a predetermined field polarity, comprising the steps of:

forming series of frames to be encoded into respective group of image pictures and generating data designating the first field in said respective group of image pictures being of the predetermined field polarity;

encoding each series of frames formed into said respective groups of image pictures; and transmitting the encoded moving picture encoded and transmitting said data designating said first field of the predetermined field polarity in each respective group of image pictures.

42. The moving picture encoding method according to claim 41, wherein said respective group of image pictures is transmitted as a stream of bits including a header with reserved areas for header information; and said step of transmitting further transmits as header information data designating that a last frame in each series to be encoded is a field of polarity other than the predetermined field polarity.

43. The moving picture encoding method according to claim 42, wherein said step of transmitting further arranges said header information according to an MPEG standard and transmits said data designating said first and last frames as user data.

44. The moving picture encoding method according to claim 41, wherein said different field polarities are top and bottom field polarities and said step of forming forms each series of frames such that said first field is of the top field polarity.

45. The moving picture encoding method according to claim 41, wherein said different field polarities are top and bottom field polarities and said step of forming forms each series of frames such that a last field in each series is of the bottom field polarity.

46. A moving picture decoding apparatus for decoding an encoded moving picture of frames encoded into groups of video image pictures including an intra-frame image picture, said frames being composed of a plurality of fields of different field polarities including a predetermined field polarity, said encoded moving picture including data designating a first field of the frames having said predetermined field polarity, comprising:

detecting means for detecting the first field designated by said data to be of said predetermined field polarity of the first field before decoding the encoded moving picture;

control means for controlling a decoding start time to begin decoding said encoded moving picture when said first field is detected by said detecting means; and decoding means, responsive to said control means, for decoding said encoded moving picture.

47. The moving picture decoding apparatus according to claim 46, wherein said encoded moving picture further includes data designating a last field having a field polarity of said predetermined field polarity; and wherein said detecting means detects the data designating the last field.

48. The moving picture decoding apparatus according to claim 46, further comprising field synchronizing signal means for generating a field synchronizing signal of alternating field polarities that controls the timing for the decoding of said fields for different field polarities.

49. The moving picture decoding apparatus according to claim 46, wherein said control means generates a start code to cause said decoding means to decode said first field when said field synchronizing signal is of said predetermined field polarity.

50. The moving picture decoding apparatus according to claim 46, wherein the decoded moving picture is displayed, further comprising scheduling means for scheduling the control means to generate said start code two cycles of the field synchronizing signal before said first field is to be displayed.

51. A moving picture decoding method for decoding an encoded moving picture of frames encoded into groups of video image pictures including an intra-frame image picture, said frames composed of a plurality of fields of different field polarities including a predetermined field polarity, said encoded moving picture including data designating a first field of the frames having said predetermined field polarity, comprising the steps of:

detecting the first field designated by said data to be of said predetermined field polarity of the first field before decoding the encoded moving picture;

controlling a decoding start time to begin decoding said encoded moving picture when said first field is detected; and decoding said encoded moving picture commencing at the decoding start-time.

52. The moving picture decoding method according to claim 51, wherein said encoded moving picture further includes data designating a last field having a field polarity of said predetermined polarity; and wherein said step of detecting detects the data designating the last field.

53. The moving picture decoding method according to claim 51, further comprising the step of generating a field synchronizing signal of alternating field polarities that times the decoding of said fields for different field polarities.

54. The moving picture decoding method according to claim 51, wherein said step of controlling generates a start code to cause the decoding of said first field when said field synchronizing signal is of said predetermined field polarity.

55. The moving picture decoding method according to claim 54, wherein the decoded moving picture is displayed, further comprising the step of scheduling the step of controlling to generate said start code two cycles of the field synchronizing signal before said first field is to be displayed.

56. A computer-readable medium for directing a computer to decode a recorded signal of encoded frames of a moving picture composed of a plurality of groups of video image pictures including an intra-frame image picture, said frames being composed of a plurality of fields of different field polarities including a predetermined field polarity, said encoded frames including data representing that a field polarity of a first frame in a respective group of image pictures is of said predetermined field polarity, and including a start decode signal for directing said computer to start decoding when a field read is the first field as designated by said data.

57. The computer-readable medium according to claim 56, wherein said recorded signal includes data designating that a field polarity of a last frame in said respective group of image pictures is of said predetermined field polarity; and further inlcuding an end decode signal for directing said computer to stop decoding on a field having a field polarity other than said predetermined field polarity.

58. The computer-readable medium according to claim 57, wherein said data designating the first and last frames is stored as user data according to an MPEG standard; and wherein said start decode signal further directs said computer to said user data on said computer-readable medium.

* * * * *